(12) United States Patent
Bakx et al.

(10) Patent No.: US 7,215,616 B2
(45) Date of Patent: May 8, 2007

(54) METHOD AND DEVICE FOR RUNNING OPTIMUM POWER CONTROL

(75) Inventors: Johannes Leopoldus Bakx, Eindhoven (NL); Gary Christopher Maul, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 592 days.

(21) Appl. No.: 10/235,440

(22) Filed: Sep. 5, 2002

(65) Prior Publication Data

US 2003/0048712 A1 Mar. 13, 2003

(30) Foreign Application Priority Data

Sep. 6, 2001 (EP) ................................. 01203357

(51) Int. Cl.
*G11B 7/00* (2006.01)
(52) U.S. Cl. ................. 369/47.53; 369/59.11; 369/59.22
(58) Field of Classification Search ............. 369/47.53, 369/53.27, 59.11, 53.22
See application file for complete search history.

(56) References Cited

U.S. PATENT DOCUMENTS

| | | | |
|---|---|---|---|
| 4,855,983 A * | 8/1989 | Arai ......................... 369/44.34 |
| 5,555,237 A | 9/1996 | Cassels et al. .............. 369/116 |
| 5,712,839 A | 1/1998 | Aoki .......................... 369/116 |
| 5,949,747 A * | 9/1999 | Miyashita et al. ........ 369/53.26 |
| 6,557,126 B1* | 4/2003 | Kelly ......................... 714/708 |
| 6,690,633 B2* | 2/2004 | Roh ........................ 369/53.22 |
| 6,775,216 B2* | 8/2004 | Kelly et al. .............. 369/53.37 |
| 2005/0259549 A1* | 11/2005 | Yokoi ...................... 369/59.11 |

FOREIGN PATENT DOCUMENTS

| | | |
|---|---|---|
| EP | 0982717 A2 | 1/2000 |
| WO | 1045391 A1 | 10/2000 |

* cited by examiner

*Primary Examiner*—Wayne Young
*Assistant Examiner*—Van T. Pham
(74) *Attorney, Agent, or Firm*—Michael E. Belk

(57) ABSTRACT

Because of the reduced track pitch of DVD compared to that of CD, the running-OPC procedures (ROPC) currently used in CD-RW systems do not function well in recordable and rewritable DVD systems. The present invention proposes to use the reflected signal from the writing spot itself instead of the satellite spots used in the CD-RW running-OPC procedure. This is realized by sampling the RF-signal reflected from the writing spot at the high-reflective crystalline level. This sampled signal ($\alpha$) is fed into a power control loop (a so-called $\alpha$-loop) to keep it at a constant level.

23 Claims, 4 Drawing Sheets

METHOD AND DEVICE FOR RUNNING OPTIMUM POWER CONTROL

The present invention relates to a method for recording information on an optical medium, and more specifically to a method for compensating for irregularities in an optical medium by controlling the power of a radiation source while recording information on the optical medium. The invention also relates to a device using the method according to the invention.

Optical media store data in digital form and include all the various CD and DVD formats. The data stored on this type of media can consist of video, text, audio, computer data, or any other form of digital information. This data is recorded on and read from an optical medium using a radiation source such as, for example, a laser.

DVD-RW (Digital Versatile Disk-ReWritable) is an optical disk format that enables data to be recorded, erased, and rewritten to the same physical disk. A somewhat different format related to DVD-RW, called DVD+RW, has been developed by the DVD+RW Consortium comprising Philips, Sony, Hewlett-Packard, Mitsubishi Chemical, Yamaha, and Ricoh. Examples of this technology are disclosed in European Patent No. EP1045391A1.

In the DVD-RW and DVD+RW formats, rewriting is possible because the disk uses a phase-change alloy as its recording medium. Whereas an organic dye layer used in one-time recording formats is permanently changed when exposed to a laser beam, the alloy used in rewritable recording layers can shift from a crystalline phase to an amorphous phase when exposed to a laser beam. By varying the power of the laser beam to control the layer temperature, crystalline areas and amorphous areas are formed. During playback of the recorded data, the crystalline areas ("lands") will in general reflect the laser light generated by a low power laser, while the amorphous areas ("marks") will absorb it.

To write, a laser beam heats an area to a temperature exceeding the melting point (500–700° C.) of the polycrystalline recording layer and the heated area shifts to an "amorphous" non-crystalline phase, thus forming a mark. To "rewrite" over previously recorded data, a laser beam heats the area again, but to a temperature somewhat less than its melting point, annealing the alloy to a crystalline phase, thus erasing the mark. The erased area can be re-encoded again with data.

Problems may arise in the process of recording to an optical medium when its surface is exposed to contamination such as dust or fingerprints, or is scratched or otherwise damaged. An optical medium, such as a CD or DVD, in comprises a polycarbonate substrate is its uppermost. In general, this polycarbonate substrate is preformed with a spiral groove that guides the laser beam as it reads, writes, or erases information on the disk. Damage or contamination can create disturbances that deflect the laser beam in an undesired way.

To address these problems, a process known in the art as "Running Optimum Power Control" (ROPC) was developed for CD-RW systems to adjust the laser power "on the-fly" in order to compensate for disturbances encountered when writing to an optical medium.

The principle of the ROPC method is to indirectly measure the laser power at the recording layer and to keep this power constant in the presence of disturbances on the disk. During a recording session, an ROPC method ascertains a "signature" for a particular optical medium by sampling signals reflected from "satellite laser spots" positioned in areas containing the marks that have been burned by the laser beam during that recording session close to the area being recorded ("writing area" or "write spot"). The size of the sample is dependent upon the bandwidth (response speed) of the system. The signature is compared with the signal reflected from the current writing area to determine whether its reflected signal is so incongruous as to indicate a disturbance. When a disturbance is encountered, the ROPC compensates this disturbance by adjusting the laser power so as to set the signal reflected from the current writing area consistently with the signature of the optical medium.

However, because of the reduced distance from one loop of the pre-formed spiral groove to the next loop ("track pitch") of DVD compared to that of CD, the ROPC method currently used in CD-RW systems is disadvantageous when used with recordable and rewritable DVD systems. For example, a typical CD-RW ROPC method measures the average value of the reflected signals from two satellite spots which are positioned midway between the tracks. On DVD media, the track pitch is typically reduced by more than a factor of two with respect to CD media (0.74 µm as opposed to 1.6 µm, respectively). In future optical media the track pitch might even be reduced further. Therefore, using the known ROPC method with DVD formats implies that the satellite laser spots on DVD media may "see" some portion of adjacent tracks. In other words, the laser spot may inadvertently detect stray signals reflected from adjacent tracks. When an adjacent track has been written, an undesirable positive feedback condition in the calculation of the average satellite signal reflections is created.

A ROPC method used in dye media is disclosed in Japanese Patent No. 10040548 wherein a peak detector and a sample-and-hold circuit detect a sample reflected light strength after a preset time period after the maximum reflected-light strength of the pit. The maximum reflected light strength and the sample reflected light strength are both detected at several instances while passing over the actual recording area before the start of recording data on the optical disk. This maximum reflected light strength is used as a reference. The maximum reflected light strength and the sample reflected light strength from the pit are again detected after data recording has started. The values are then compared, and a ROPC is performed on the basis of the result of the comparison. However, because this method also samples from the less-reflective pits, it may also detect stray signals such as, for example, reflected from old pits that are being rewritten.

Therefore, it is an object of the invention to provide a method and a device for obtaining a reliable reflected signal sample, thereby achieving accurate laser power control.

This object is achieved by providing a method and a device as described below in detail. The method and the device according to the present invention address the described problem in the art by using the signal reflected from the write spot itself, rather than from the satellite spots, to monitor and control the actual laser power received at the write spot. Sample integrity is realized by sampling the reflected signal at the high reflective crystalline level rather than at the amorphous level. Furthermore, accurate power control is achieved by feeding the sampled value into a power control loop.

According to an embodiment of the invention, first an optimum write power for a specific combination of disk and recorder is determined, for example, by executing an Optimum Power Calibration (OPC) procedure. For phase-change media such an OPC procedure may be based on the well-known γ-criterion.

Next, the parameters of the ROPC are tuned to obtain a proper working range for a power control loop. This is accomplished by using the optimum write power established in the previous step to normalize subsequent power readings calculated from reflections observed at the write spot during a writing session. In other words, the optimum write power is used as the reference value with which subsequent power readings are compared.

Next, the working range is calibrated by conducting a first series of test writings at the optimum write power in an undisturbed area of the disk and with the power control loop disabled. During the test writings, reflected signal samples are taken and the gain is adjusted such that an integrator loop will provide filtered averaging of the reflected signals. A second series of test writings is then conducted with the power control loop enabled, the calibration being invalidated if the reflected signal indicates that a maximum power level was exceeded.

Finally, a writing session is initiated. As information is written to the recording medium, the ROPC samples signals reflected from the writing spot and monitors and controls the laser power accordingly. When surface damage or contamination, such as a fingerprint on the surface, is encountered, the reflection (and hence the measured power) drops. In response the actual power of the laser is adjusted accordingly so as to remain within predetermined power control limits. The predetermined power control limits ensure that the actual laser power is maintained at levels between approximately 100% of the optimum write power and a predetermined maximum power level.

The above approach guarantees that the ROPC is only effectively operational during a disturbance, because on a clean area the power is consistently optimal.

According to a further embodiment of the invention, reflected signals are sampled from the writing spot at the high reflective crystalline "erase" level. The reflected signals are then fed through a low-pass filter, thereby reducing the sample noise due to reflections from old pits that are being overwritten. This approach is advantageous in that the high reflectivity of the intended sample area allows filtering of unintended signal frequencies, because these unintended signals are, in general, reflected from non-crystalline areas.

According to one aspect of the invention, the timing of reflected signal sampling is programmable such that samples are only taken from a thermally stable part of the crystalline plateau.

The present invention can be implemented in either the current domain or in the voltage domain of the signals reflected from the recording medium.

The present invention will be described in detail hereinafter on the basis of exemplary embodiments of the invention and with reference to the accompanying drawings; therein:

Generally speaking, the method and the device according to the present invention control a power level of a laser beam by sampling a reflected signal at a crystalline plateau of a write spot, filtering out low-level reflected signals, and converting it to an input signal α. The actual power level $P_{actual}$ received at the write spot 130 is then maintained by a power control loop (the α-loop) within a predetermined range around the optimal power level $P_{OPT}$. An effective ROPC is thus established for writable and rewritable media.

Figure 1:
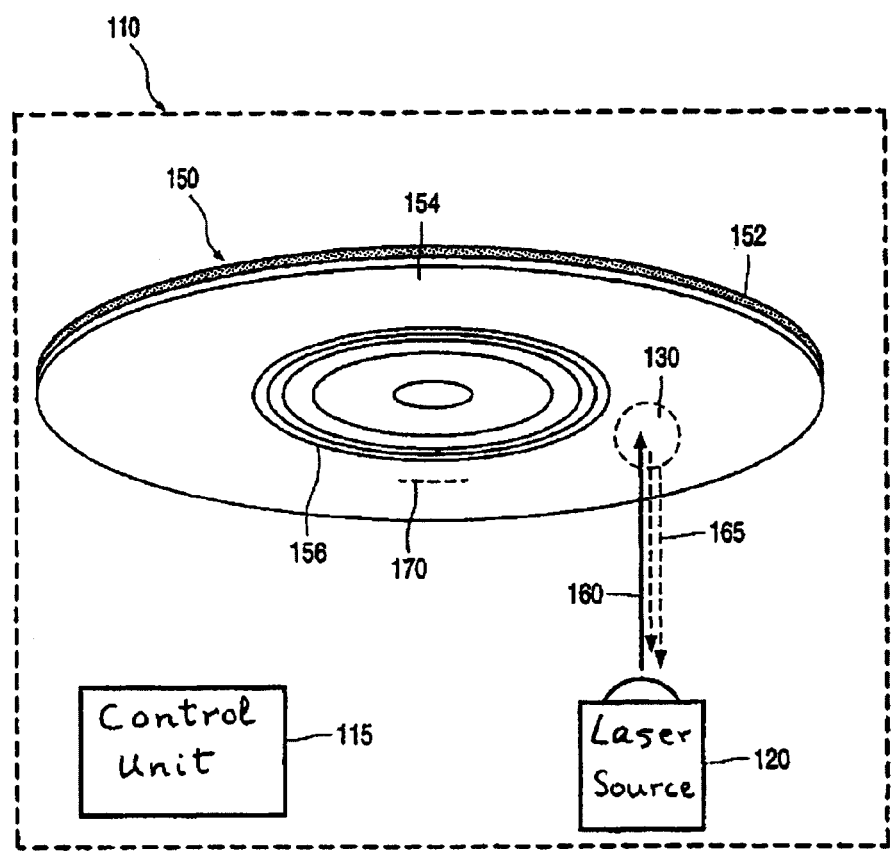
FIG. 1 is a diagram illustrating the interaction between an optical recording medium and a device according to an embodiment of the invention.

A description of an exemplary embodiment of the present invention will hereinafter refer to the drawings in which like numerals indicate like elements throughout the drawings. FIG. 1 is a diagram illustrating the interaction between an optical recording medium, a disk 150, and a device according to the exemplary embodiment. In this exemplary embodiment, the present invention operates to control the power of a laser in, for example, a DVD+RW recorder 110. The DVD+RW recorder 110 includes at least one laser source 120 which irradiates a write spot 130 on the recording surface 152 of a writable or rewritable medium which is typically a disk 150. The disk 150 includes a recording surface 152 and an upper layer 154 that is typically composed of a polycarbonate substrate. The upper layer 154 of the disk 150 is preformed with a circular or spiral groove 156. When writing to the disk 150, a laser beam 160, generated by the laser 120, burns marks in the groove 156, thereby forming pits 170 in the recording surface 152. The creation of each pit 170 typically requires a series of pulses from the laser 120. The laser 120 typically generates a laser beam 160 capable of having at least three different power levels, $P_W$, $P_E$, and $P_B$. $P_W$ denotes the write power, $P_E$ denotes the erase power, and $P_B$ denotes the power level between the writing pulses. As the laser 120 writes to the disk 150, a portion of the laser light is reflected from the disk 150 and produces reflected signals 165.

According to the exemplary embodiment, the recorder 110 also comprises means, such as a control unit 115, for controlling the processes in the recorder 110. This control unit 115 may consist of a single unit or of a multitude of units, each controlling a separate part of the recorder 110. Furthermore, the control unit may consists of a hardware unit or, alternatively, of a processor unit controlled by a corresponding control program.

This exemplary embodiment of the invention is applies a, so-called write strategy for phase-change media in which areas on the recording surface 152 can be transformed to and from a crystalline phase by varying the power level of the radiation beam 160 produced by the laser 120. However, those skilled in the art should appreciate that the invention may be practised in other applications and with any optical medium. Media candidates are DVD+RW, DVD-RW, and DVD-RAM, which are all phase-change media that use the DVD format. However, the method is also applicable to CD-RW media. Furthermore, it can also apply to dye media such as DVD+R, DVD-R and CD-R, although in these instances sampling does not occur at a crystalline plateau but during the "read" phase between write pulses.

Figure 2:
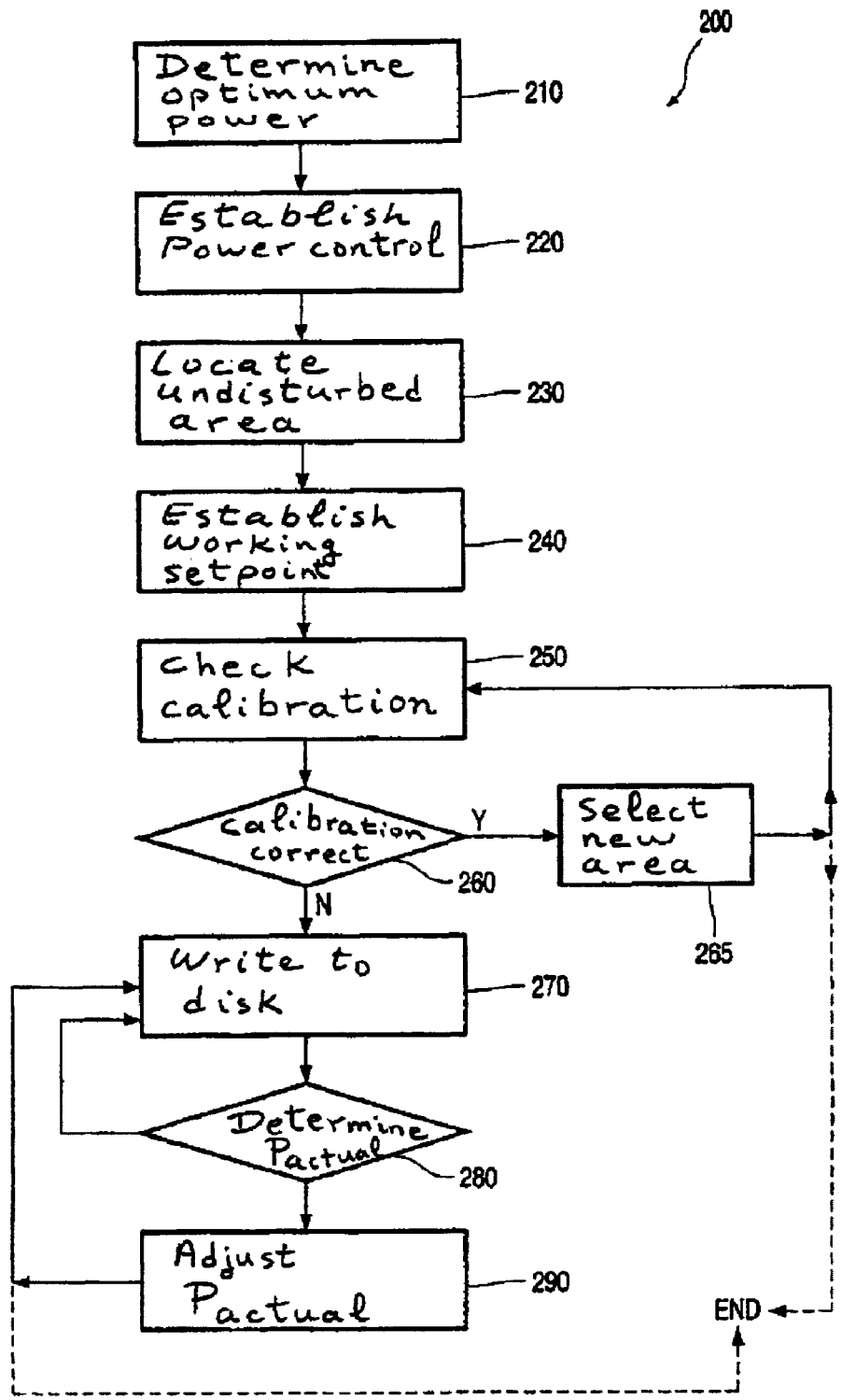
FIG. 2 is a flow chart illustrating in general the operation of a method according to the invention.

FIG. 2 shows a flow chart that illustrates an exemplary method 200 of this invention. The exemplary method 200 starts at step 210 in which the optimum writing power ($P_{OPT}$) is determined by executing an Optimal Power Calibration (OPC) protocol. Such an OPC is well-known in the art and typically involves conducting a test writing in a designated test area, generally known as the Power Calibration Area (PCA), while the actual writing power level ($P_{actual}$) is adjusted in steps. The actual writing power level ($P_{actual}$) that produces recorded marks with optimal modulation properties is designated as $P_{OPT}$. In the method according to the present invention, the α-loop 300 is switched off during OPC.

The method proceeds to steps 220, 230, 240, 250 and 260 which collectively make up the three-step process of calibrating the α-loop. First, in step 220, power control limits are established according to the OPC procedure. The OPC procedure yields an optimum power $P_{OPT}$, the value of which will be referenced as 100%. $P_{OPT}$ is the optimum value required by a clean and undisturbed area of the disk. Next, the power control limits of the α-loop 300 are set at $P_{MIN}$ and $P_{MAX}$ which, in an embodiment, equal 100% and 120% of $P_{OPT}$, respectively.

Figure 4:
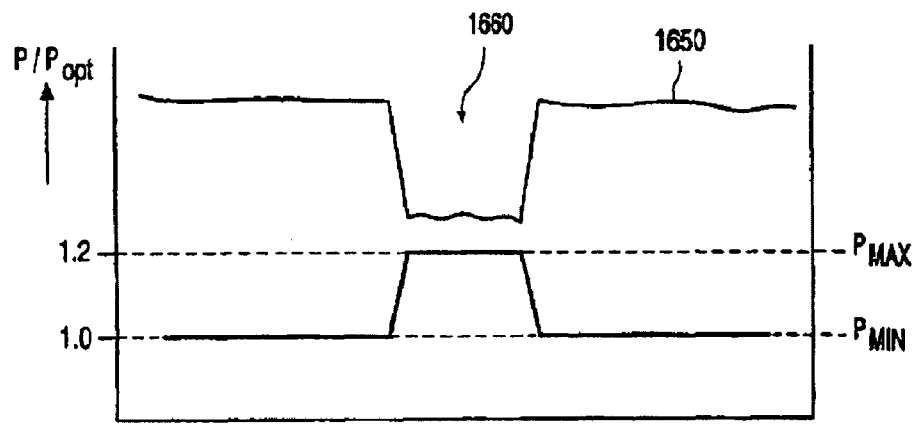
FIG. 4 is a chart illustrating the effects of operating a power control loop according to an embodiment of the present invention.

The next stage in the process of calibration of the α-loop 300 occurs in steps 230 and 240. In step 230 an undisturbed area on the recording medium, that is an area without irregularities, is located. In step 240 a working setpoint for the α-loop 300 is established such that, in the absence of power limits $P_{MIN}$ and $P_{MAX}$, the actual writing power level ($P_{actual}$) maintained with the ROPC enabled would be just below 100%, as is illustrated in FIG. 4. The setpoint for the α-loop 300 is established by conducting a test writing with the power control loop (that is de α-loop) off. This step 240 is shown in detail in FIG. 5 and is described in greater detail below.

The final stage in the process of calibration of the α-loop 300 takes place in steps 250, 260, and 265, where the method of this invention checks the integrity of the calibration performed in the previous stages to ensure that the undisturbed test area is truly free of disturbances. This stage is shown in detail in FIG. 6 and is described in greater detail below.

Again referring to FIG. 2, having calibrated the α-loop 300, the method of the invention proceeds to step 270 if a calibration integrity check in step 260 indicates that $P_{actual}$, which in the exemplary embodiment equals the reflected erase power $P_{RE}$, does not exceed $P_{MAX}$. In step 270 writing of information to the disk 150 starts. As information is written, the signals 165 reflected from the write spot 130 are continuously or periodically sampled. The signals representing the sampled reflected signals 160 can either be currents or voltages and are used to calculate the reflected erase power $P_{RE}$. When the single-pass reflection of the disk's substrate is denoted by r, the reflected erase power $P_{RE}$ on the recording layer becomes $$P_{RE}=P_E \cdot r$$

while the detected erase level $V_E$ becomes $$V_E=c \cdot P_E \cdot r^2=c \cdot P_{RE} \cdot r$$

where c is a constant. This yields a relation between $P_{RE}$ on the recording layer and the detected crystalline level $V_E$:

$$P_{RE}=P_E \cdot r=V_E/(c \cdot r)=\sqrt{(V_E \cdot P_E)/c}.$$

Figure 5:
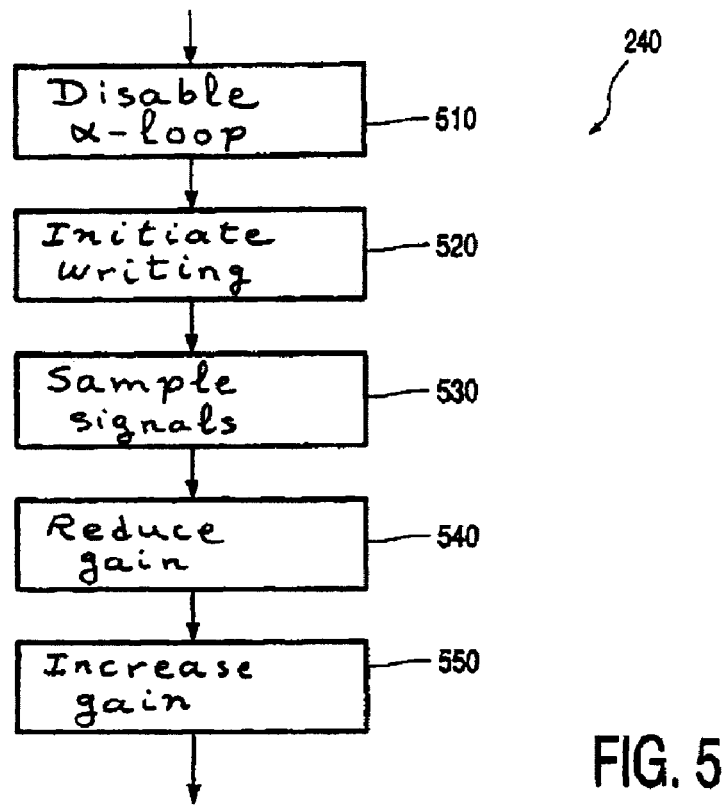
FIG. 5 is a flow chart illustrating in detail the operation of a part of a power control loop according to an embodiment of the present invention.

In FIG. 5 the step 240 of the calibration process in which the working point of the α-loop 300 is calibrated is illustrated in detail. First, in sub-step 510 the α-loop is disabled. The next sub-step 520 is to initiate a sequence of test writing at $P_W=P_{OPT}$. The reflected signals 165 are sampled in sub-step 530. Next, in sub-step 540 the gain ("α-gain") of the sampled input α is reduced from an initially maximum value to a value at which the output of a loop integrator changes sign (that is, becomes positive). If the gain is too high, the value subtracted from $P_{OPT}$ will be higher than $P_{OPT}$ resulting in a negative input to the integrator, and hence in a negative output. Note that as long as the α-loop 300 is switched off, varying the α-gain does not influence the write power $P_{actual}$ during this sub-step. When the output of the integrator equals exactly zero, switching the ROPC on will cause no discontinuity in $P_{actual}$, even if the 100% and 120% limits are not active, since $P_{MIN}$ is equal to $P_{OPT}$. The power control would start at 100% without clipping. However, if $P_{MIN}$ were not set to 100% of $P_{OPT}$, the α-loop 300 would provide control at approximately 95% of $P_{OPT}$.

Therefore, in sub-step 550 the gain is increased again by one increment after finding the gain value at which the integrator output changes sign, and subsequently step 240 proceeds to its end. The output of the integrator 320 is used to determine the calibration of the working point of the α-loop 300. Integrator 320 is used, rather than a subtractor, since a varies along the disk's circumference and is rather noisy. The integrator 320 acts as an averaging filter.

Figure 6:
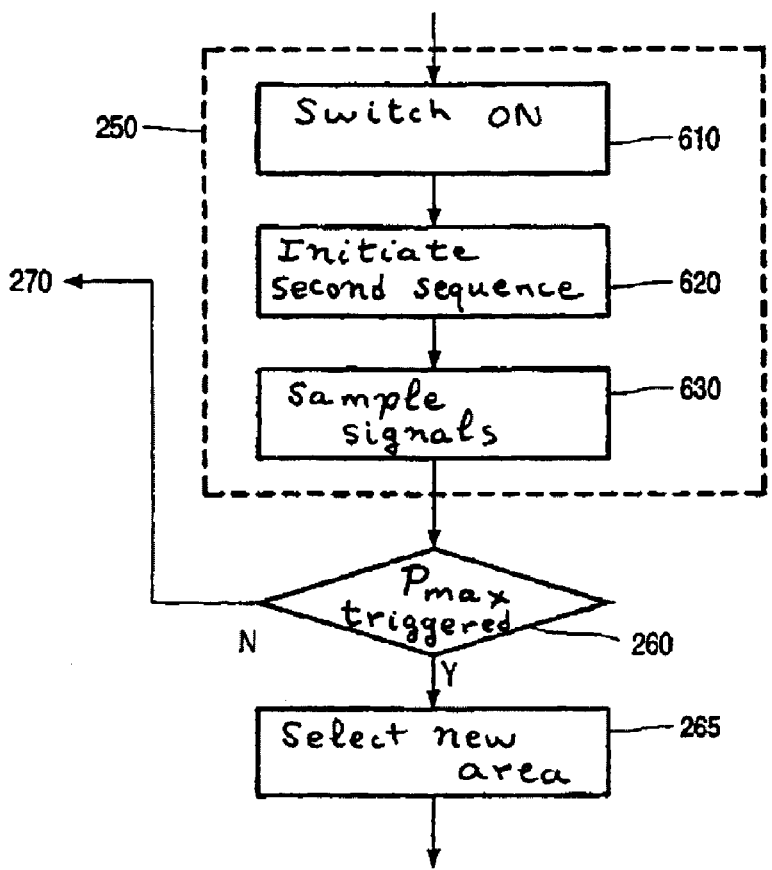
FIG. 6 is a flow chart illustrating in detail the operation of a part of a power control loop according to an embodiment of the present invention.

FIG. 6 illustrates in detail the steps 250, 260, and 265 of calibration of the α-loop 300. After the correct value of α-gain has been determined, the ROPC is enabled by setting the ROPC switch 340 to the "on" position (that is, enable the α-loop) in step 610.

Accordingly, on an undisturbed area the power will then immediately clip at 100%. The motive for clipping at 100% is that otherwise the power would vary due to small reflection variations, birefringence of the disk and direct-overwrite (DOW) cycles. These variations have nothing to do with the actual writing process, and hence should not influence the write power. In step 620 the method initiates a second sequence of test writing which is conducted on the same undisturbed area as before. In step 630 the reflected signals are sampled. Using the same time period over which integration is performed, in step 260 it is determined whether $P_{MAX}$ is triggered. When $P_{RE}$ indeed indicates that $P_{MAX}$ has been exceeded, the test area is assumed to be disturbed in some way and the calibration procedure is regarded as unreliable. Then, in step 265 a new undisturbed test area is selected and the method reverts to step 250 or, alternatively, the method proceeds such that the writing session is either terminated or is continued without the use of a ROPC.

Additionally, during a typical session of writing user data, a trigger of the upper limit $P_{MAX}$ may indicate a loss of data integrity. The recorder could then opt to perform a retry, reallocate the data block, or issue a warning message.

Once the α-loop 300 has been calibrated and the calibration has been verified, the method is ready to operate under working conditions. A writing session, where user information is transferred to the recording surface and during which $P_{actual}$ is measured with the α-loop enabled, is illustrated by step 270 in FIG. 2. As writing occurs, the reflected signals 165 from the write spot 130 are sampled and converted to a signal for use in the α-loop 300.

The principle of the sampling method used in the present invention is that reflected signals 165 are sampled which originate from the write spot 130, and more specifically from a point in the write spot 130 where the recording surface 152 is at a crystalline plateau. Furthermore, in the present invention the timing of the sampling is such that it occurs at a thermally stable point on the crystalline plateau, between $\Delta T_1$ and $\Delta T_2$. Because the reflected signals 165 are sampled at the crystalline plateau, which is highly reflective, signal frequencies that are reflected from non-crystalline areas can be filtered out, for example using a low pass filter, before the reflected signals 165 are converted to power measurements.

Figure 3:
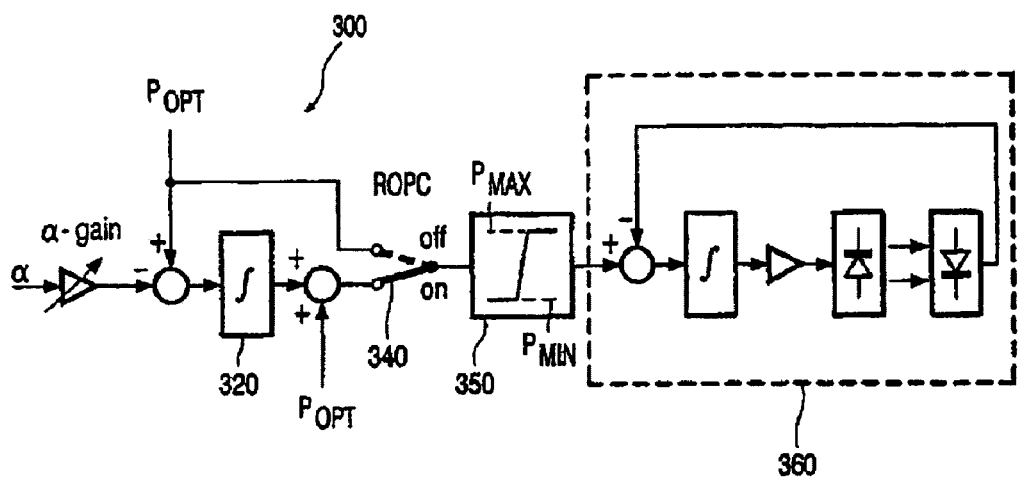
FIG. 3 is a functional block diagram of a power control loop according to an embodiment of the invention.

As shown in FIG. 3, the α-loop 300 of the exemplary embodiment is implemented in combination with a conventional power control loop 360. Without the features according to the present invention, the power control loop 360 would vary $P_{actual}$, as measured, for example, by a photodetector, according to a predetermined setpoint. The ROPC methodology according to the present invention is characterized in that is varies this setpoint according to α Specifically, the setpoint is the output of an integrator 320 to the power control loop 360 which changes as long as α remains within a specific range. The range, $P_{MIN}$ to $P_{MAX}$, is set by the programmable limiter 350. In this way, with the ROPC active, the laser power $P_{actual}$ can only vary between these limits, as is illustrated in FIG. 4. FIG. 4 shows that $P_{actual}$ is maintained between $P_{MIN}$ and $P_{MAX}$.

During writing of user information, the α-loop 300 continuously monitors α When, in step 280, it is determined that $P_{actual}$ exceeds $P_{MAX}$ or drops below $P_{MIN}$, $P_{actual}$ is adjusted accordingly in step 290 and writing continues in step 270. If there is no more information to be writen to the recording medium, the method proceeds to its end.

A writable or rewritable medium 150 includes, for example, a recording surface 152 and a polycarbonate substrate upper layer 154. In the upper layer 154, a spiral groove 156 is preformed. A laser beam writes information to the medium 150 by forming pits or marks 170 into the recording surface 152 while following the groove 156. The area being written by the laser beam is the write spot 130. Reflected signals 165 are sampled and converted to +, which is the input to the α-loop 300 that controls $P_{actual}$. During a typical writing session the power to the laser $P_{actual}$ will closely track the optimum write power $P_{OPT}$ until a disturbance such as, for example, a fingerprint, is encountered on the disk. This disturbance causes a decrease 1660 in the reflected signals 165 and hence in a control signal 1650 representing the reflected signals 165. As is shown in FIG. 4, the α-loop 300 responds by raising $P_{actual}$ to increase the power of the laser beam actually received at the write spot. However, the adjustment of $P_{actual}$ is limited by $P_{MAX}$ and $P_{MIN}$ which were set during the calibration of the α-loop 300. In the exemplary embodiment, $P_{MAX}$ and $P_{MIN}$ represent 120% and 100% of the optimum writing power $P_{OPT}$ for the relevant disk 150.

In view of the foregoing, it will be appreciated that the present invention provides devices and methods for writing information to a writable and/or rewritable medium while maintaining constant writing power at the recording surface 152. Still, it is to be understood that the foregoing relates only to the exemplary embodiments of the present invention and that numerous changes may be made thereto without departing from the spirit and scope of the invention as defined by the following claims.

The invention claimed is:

1. A method of recording information on a writable or rewritable medium by means of a radiation beam having a write power level, the method comprising the acts of:
    determining an optimum write power level for writing to the medium by performing an Optimum Power Calibration (OPC) protocol;
    writing a series of test writings to the medium using the optimum write power level;
    sampling reflected signals from the test writings to form a sampled signal;
    directing the sampled signal into a power control loop;
    calibrating the power control loop to establish the write power level within a minimum value and a maximum value for the write power level, said minimum value and said maximum value being proportional to the optimum write power level;
    writing information to a recording surface of the medium while sampling signals reflected from a write spot on the medium, the write spot being an area on the recording surface to which the radiation beam is currently writing; and
    changing the write power level based on the sampling signals within the minimum value and the maximum value such that a substantially constant writing power received by the recording surface is maintained.

2. The method as claimed in claim 1, wherein the write power level is controlled by controlling an actual current applied to a radiation source.

3. The method as claimed in claim 1, wherein the reflected signals being sampled are reflected from a location where the recording surface is in a crystalline phase.

4. The method as claimed in claim 3, wherein the sampling of the reflected signals is timed such that samples are only taken from a substantially thermally stable part of a crystalline plateau.

5. The method as claimed in claim 3, wherein the sampled signal is filtered by a low-pass filter.

6. The method as claimed in claim 1, wherein the reflected signals are sampled when power of the radiation beam is in a read phase between write pulses.

7. A method as claimed in claim 1, further comprising the act of calculating the write power level on the basis of the sampled signal.

8. A method as claimed in claim 1, further comprising the acts of:
    disabling the power control loop;
    locating an undisturbed area on the recording surface; and
    writing to the undisturbed area.

9. A method as claimed in claim 8, further comprising the acts of:
    enabling the power control loop;
    writing to the undisturbed area; and
    invalidating the write power level of the radiation beam applied to the write spot if the write power level exceeds the maximum value.

10. The method of claim 1, wherein the changing act further comprises limiting the write power level to between about 100% of the optimum write power level and a predetermined maximum power level.

11. A device for recording information on a writable or rewritable medium by means of a radiation beam, the device comprising:
    a radiation source for generating the radiation beam;
    a detector for detecting reflected signals that are reflected from a write spot; and
    a power control loop which controls the radiation source for providing a writing power of the radiation beam applied to a recording surface of the medium;
    wherein the power control loop is configured for calibration by establishing a minimum value and a maximum value for the writing power, said minimum value and said maximum value being proportional to an optimum write power level of the radiation beam for writing to the medium, wherein said writing power is configured based on the reflected signals.

12. The device as claimed in to claim 11, further comprising a limiter configured to limit the writing power to said minimum value and said maximum value.

13. The device as claimed in claim 11, further comprising means for controlling sampling of the reflected signals such that the reflected signals being sampled are reflected from a location where the recording surface is in a crystalline phase.

14. The device as claimed in claim 13, further comprising means for controlling timing of the sampling of the reflected signals such that samples are only taken from a substantially thermally stable part of a crystalline plateau.

15. The device as claimed in claim 11, further comprising means for controlling sampling of the reflected signals such that the reflected signals are sampled when actual power of the radiation beam is in a read phase between write pulses.

16. The device as claimed in claim 11, further comprising a low-pass filter for filtering a sampled signal formed from the reflected signals.

17. The device of claim 11, further comprising:
a limiter which controls an input to the power control loop; and
a switch for enabling and disabling the power control loop.

18. A method of recording information on a writable or rewritable medium by means of a radiation beam having a write power level, the method comprising the acts of:
determining an optimum write power level for writing to the medium by performing an Optimum Power Calibration (OPC) protocol;
calibrating a working range of the write power level by writing a series of test writings to the medium using the optimum write power level, sampling a series of reflected signals from the test writings, and adjusting the write power level in accordance with a filtered average of the series of reflected signals;
writing information to a recording surface of the medium while sampling signals reflected from a write snot on the medium, the write spot being an area on the recording surface to which the radiation beam is currently writing; and
changing the write power level based on the sampling signals within the working range such that a substantially constant writing power received by the recording surface is maintained;
wherein prior to the calibrating act, parameters of a Running Optimum Power Control protocol (ROPC) are tuned to normalize the working range to the optimum write power level.

19. The method of claim 18, wherein writing information to the recording surface includes sampling signals using the ROPC.

20. A device for recording information on a medium using a radiation beam having a write power level, the device comprising:
means for determining an optimum write power level for writing to the medium by performing an Optimum Power Calibration (OPC) protocol;
means for writing a series of test writings to the medium using the optimum write power level;
means for sampling reflected signals from the test writings to form a sampled signal;
means for directing the sampled signal into a power control loop;
means for calibrating the power control loop to establish a minimum value and a maximum value for the write power level, said minimum value and said maximum value being proportional to the optimum write power level;
means for writing information to a recording surface of the medium while sampling signals reflected from a write spot on the medium, the write spot being an area on the recording surface to which the radiation beam is currently writing; and
changing the write power level based on the sampling signals within the minimum value and the maximum value based on the sampling signals such that a substantially constant writing power received by the recording surface is maintained.

21. A method of recording information on a writable or rewritable medium by means of a radiation beam having a write power level, the method comprising the acts of:
determining an optimum write power level for writing to the medium by performing an Optimum Power Calibration (OPC) protocol;
writing a series of test writings to the medium using the optimum write power level;
sampling reflected signals from the test writings to form a sampled signal;
directing the sampled signal into a power control loop;
calibrating the Dower control loop to establish the write power level within a minimum value and a maximum value for the write power level, said minimum value and said maximum value being proportional to the optimum write power level;
writing information to a recording surface of the medium while sampling signals reflected from a write spot on the medium, the write spot being an area on the recording surface to which the radiation beam is currently writing;
changing the write power level within the minimum value and the maximum value such that a substantially constant writing power received by the recording surface is maintained;
disabling the power control loop;
locating an undisturbed area on the recording surface; and
writing to the undisturbed area.

22. A method as claimed in claim 21, further comprising the acts of:
enabling the power control loop;
writing to the undisturbed area; and
invalidating the write power level of the radiation beam applied to the write spot if the write power level exceeds the maximum value.

23. A method of recording information on a writable or rewritable medium by means off a radiation beam having a write power level, the method comprising the acts of:
determining an optimum write power level for writing to the medium by performing an Optimum Power Calibration (OPC) protocol;
writing a series of test writings to the medium using the optimum write power level;
sampling reflected signals from the test writings to form a sampled signal;
directing the sampled signal into a power control loop;
calibrating the power control loop to establish the write power level within a minimum value and a maximum value for the write power level, said minimum value and said maximum value being proportional to the optimum write power level;
writing information to a recording surface of the medium while sampling signals reflected from a write spot on the medium, the write spot being an area on the recording surface to which the radiation beam is currently writing;
changing the write power level within the minimum value and the maximum value such that a substantially constant writing power received by the recording surface is maintained; wherein the changing act further comprises limiting the write power level to between about 100% of the optimum write power level and a predetermined maximum power level.

* * * * *